United States Patent [19]

Lynch

[11] Patent Number: 5,901,076

[45] Date of Patent: May 4, 1999

[54] RIPPLE CARRY SHIFTER IN A FLOATING POINT ARITHMETIC UNIT OF A MICROPROCESSOR

[75] Inventor: Thomas W. Lynch, Austin, Tex.

[73] Assignee: Advanced Micro Designs, Inc., Sunnyvale, Calif.

[21] Appl. No.: 08/843,462

[22] Filed: Apr. 16, 1997

[51] Int. Cl.[6] .............................. G06F 7/42; G06F 7/00
[52] U.S. Cl. .............................. 364/748.11; 364/715.08
[58] Field of Search .......................... 364/748.11, 715.08

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 4,999,800 | 3/1991 | Birger ................................ 364/715.08 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter2: Microprocessor Architecture Overview," pp. 2–1 through 2–4, undated.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Tan V. Mai
*Attorney, Agent, or Firm*—Conyon, Rose & Tayon, PC; B. Noel Kivlin

[57] ABSTRACT

A floating point arithmetic unit is provided which effectuates arithmetic operations upon floating point numbers. A comparator unit, which may be implemented using a carry-skip chain, determines the relative magnitudes of the exponents of the floating point numbers to be operated upon. A first ripple carry subtractor unit formed within a first ripple carry shifter subtracts a first value corresponding to the exponent of a first of the floating point numbers from a second value corresponding to the exponent of a second of the floating point numbers. A second ripple carry subtractor unit formed within a second ripple carry shifter subtracts the second value from the first value. When certain lower order bit results of the exponent value subtraction operations of each ripple carry subtractor are obtained, the mantissa of the floating point number with the smaller exponent provided to one of the carry ripple shifters is shifted to the right by a number of positions dependent upon the lower order bit results. Effectuation of this shift operation begins before determining certain intermediate order and high order bit results of the subtraction operation. When certain intermediate bit results of the exponent subtraction operation are obtained, further shifting of the mantissa is effectuated before the highest order bit results of the subtraction operation are determined. A final shift operation is effectuated upon determining the highest order bit results of the ripple carry subtraction operation. An output signal from the comparator unit, which determines the relative magnitudes of the exponents of the two floating point numbers being operated upon, selects the shifted mantissa output from the ripple carry shifter associated with the mantissa of the floating point number with the smaller exponent. This shifted mantissa is provided to an input of an adder/subtractor unit.

13 Claims, 4 Drawing Sheets

U.S. PATENT DOCUMENTS

| | | | |
|---|---|---|---|
| 5,016,209 | 5/1991 | Ikeda et al. | 364/715.08 |
| 5,053,631 | 10/1991 | Perlman et al. . | |
| 5,058,048 | 10/1991 | Gupta et al. . | |
| 5,129,067 | 7/1992 | Johnson . | |
| 5,136,697 | 8/1992 | Johnson . | |
| 5,166,898 | 11/1992 | Ishihara | 364/748.11 |
| 5,226,126 | 7/1993 | McFarland et al. . | |
| 5,226,130 | 7/1993 | Favor et al. . | |

RIPPLE CARRY SHIFTER IN A FLOATING POINT ARITHMETIC UNIT OF A MICROPROCESSOR

BACKGROUND OF THE INVENTION

1. Field of the Invention

The present invention relates to floating point arithmetic units and, more particularly, to addition and subtraction operations performed upon floating point numbers in a floating point unit of a microprocessor.

2. Description of the Related Art

Microprocessors typically include floating point units to accommodate floating point arithmetic operations. A floating point number consists of two parts: a fraction f and an exponent e. The two parts represent a number that is obtained by multiplying the fraction f times a radix that is raised to the power of e. The fraction f of the floating point number is often referred to as the mantissa.

A 32-bit binary format for a floating point number is shown in FIG. 1. The exemplary floating point number of FIG. 1 includes a 24-bit fractional part, a 7-bit signed (positive or negative) exponent, and a sign bit that indicates the sign of the number.

Addition and subtraction operations associated with floating point numbers are somewhat more complicated than addition and subtraction of integer numbers. Before actually performing an addition or subtraction operation upon the mantissas of the numbers, since the numbers are typically normalized, the relative magnitudes of the exponents must be compared to align the mantissas, if necessary. If the two exponents are equal, thus indicating that the mantissas are already aligned, the arithmetic operation can be effectuated by directly adding (or subtracting) the mantissas according to the desired operation. However, if the exponents are not equal, then the mantissa with the smaller exponent is typically shifted to the right by a number of positions equal to the difference between the exponents. Once the mantissas have been aligned, an arithmetic operation of addition or subtraction may be performed upon the aligned mantissas in accordance with the desired operation. Subsequently, post normalization of the result is carried out. It is noted that subtraction may be carried out by two's complementing the subtrahend and performing an addition operation. For the special case in which one of the operands is equal to zero, other specific operations may be performed.

FIG. 2 illustrates a generalized block diagram of aspects of an exemplary floating point arithmetic unit. As illustrated in FIG. 2, the two floating point numbers A1 and B1 to be added (or subtracted) are compared within a comparator 20 to determine their relative magnitudes. The exponent value of the floating point number with the smaller exponent is subtracted from the exponent value of the floating point number with the larger exponent by subtractor 22. After subtracting the value of the smaller exponent from the value of the larger exponent, the result is provided to a shift unit 24 which shifts the mantissa associated with the floating point number having the smaller exponent by a number of positions to the right which is equal to the difference in the exponent values. Subsequently, the shifted mantissa along with the unshifted mantissa of the floating point number having the larger exponent are operated upon (either added or subtracted) by an adder/subtractor unit 26 depending upon the desired operation (i.e. add or subtract) as well as upon the signs of the floating point numbers. The result conveyed from the adder/subtractor unit 26 may then be normalized by normalization unit 28.

The operation of the circuit of FIG. 2 may be illustrated by the following example. Consider a situation in which two normalized operands are to be added as follows:

$$1.10110000 \times 2^4$$
$$\underline{+1.10001000 \times 2^6}$$

The circuit first subtracts the smaller exponent value of 4 (in decimal) from the larger exponent value of 6, which results in a value of 2. The floating point number having the smaller exponent is accordingly right shifted by two positions and operated upon as follows:

$$0.01101100 \times 2^6$$
$$\underline{+1.10001000 \times 2^6}$$
$$1.11110100 \times 2^6$$

As shown above, the exponent of the right shifted value is further increased by 2. The fractional portions or mantissas of the floating point numbers are then added to obtain the result. At this point, the result may or may not require normalization, which is effectuated by normalization unit 28 if appropriate.

Not surprisingly, it is important in high performance microprocessors to effectuate floating point operations quickly. From the foregoing description, however, it is evident that substantial time may be required to finish the subtraction of the exponents to determine the amount by which a particular mantissa must be shifted. It would be desirable to perform this shift operation more expeditiously.

SUMMARY OF THE INVENTION

The problems outlined above are in large part solved by a floating point arithmetic unit including a ripple carry shifter in accordance with the present invention. In one embodiment, a floating point arithmetic unit is provided which effectuates arithmetic operations upon floating point numbers. A comparator unit, which may be implemented using a carry-skip chain, determines the relative magnitudes of the exponents of the floating point numbers to be operated upon. A first ripple carry subtractor unit formed within a first ripple carry shifter subtracts a first value corresponding to the exponent of a first of the floating point numbers from a second value corresponding to the exponent of a second of the floating point numbers. A second ripple carry subtractor unit formed within a second ripple carry shifter subtracts the second value from the first value. When certain lower order bit results of the exponent value subtraction operations of each ripple carry subtractor are obtained, the mantissa of the floating point number with the smaller exponent provided to one of the carry ripple shifters is shifted to the right by a number of positions dependent upon the lower order bit results. Effectuation of this shift operation begins before determining certain intermediate order and high order bit results of the subtraction operation. When certain intermediate bit results of the exponent subtraction operation are obtained, further shifting of the mantissa is effectuated before the highest order bit results of the subtraction operation are determined. A final shift operation is effectuated upon determining the highest order bit results of the ripple carry subtraction operation. An output signal from the comparator unit, which determines the relative magnitudes of the exponents of the two floating point numbers being operated upon, selects the shifted mantissa output from the ripple carry shifter associated with the mantissa of the floating point number with the smaller exponent. This shifted mantissa is provided to an input of an adder/subtractor unit. The unshifted mantissa of the floating point number with the larger exponent value is further provided to a second input of the adder/subtractor unit. The adder/subtractor unit subsequently performs either an addition or subtraction operation upon the two mantissas depending upon the desired operation as well as upon the sign of the numbers. The computed result from the adder/subtractor unit may then be normalized by a normalization unit.

The ripple carry shifter thus includes two or more serially coupled shift stages wherein the mantissa of an input floating point number is shifted by a designated amount depending upon the generation of certain low order bit results of an exponent subtraction operation prior to the generation of certain intermediate order and/or high order bit results of the subtraction operation. The amount the mantissa is shifted upon determining each bit result of the ripple carry subtraction operation depends upon the order of the result bit. For example, upon determining the lowest order result bit of the subtract operation, if such result bit is set, the mantissa is shifted by one position. Likewise, if the second order bit of the result when determined is set, the mantissa is shifted by two additional positions, and if the third order bit is set, the mantissa is shifted by four additional positions, and so on, as the particular results are determined. Since the mantissa is shifted initially in accordance with the lower order result bits of the ripple carry subtraction operation before obtaining the entire result of the subtract operation, the overall shift required for the mantissa may be completed sooner in comparison to waiting until the entire subtract operation is complete before effectuating a shift operation. High performance floating point units may thereby be implemented.

Broadly speaking, the present invention contemplates a ripple carry shifter structure for a floating point arithmetic unit which performs arithmetic operations upon floating point numbers. The ripple carry shifter structure comprises a ripple carry subtractor unit configured to subtract an exponent of a first floating point number from an exponent of a second floating point number. The ripple carry subtractor unit is further configured to generate a low order bit subtraction result prior to generating a higher order bit subtraction result. The ripple carry shifter structure also comprises a shift unit for shifting a mantissa of one of the floating point numbers. The shift unit is configured to begin a shift operation of the mantissa in response to the low order bit subtraction result of the ripple carry subtrator unit before the higher order bit subtraction result is generated by the ripple carry subtractor unit.

BRIEF DESCRIPTION OF THE DRAWINGS

A better understanding of the present invention can be obtained when the following detailed description of the preferred embodiment is considered in conjunction with the following drawings, in which.

Figure 1:
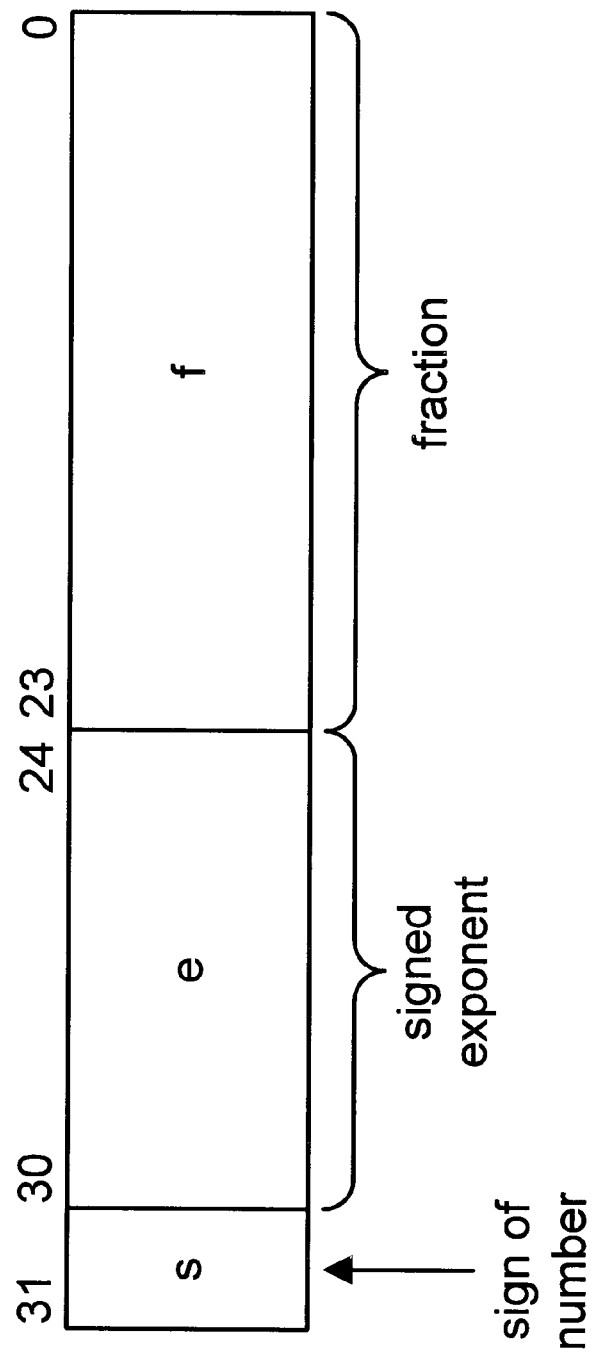
FIG. 1 is a diagram illustrating an exemplary binary format for a floating point number.
Figure 2:
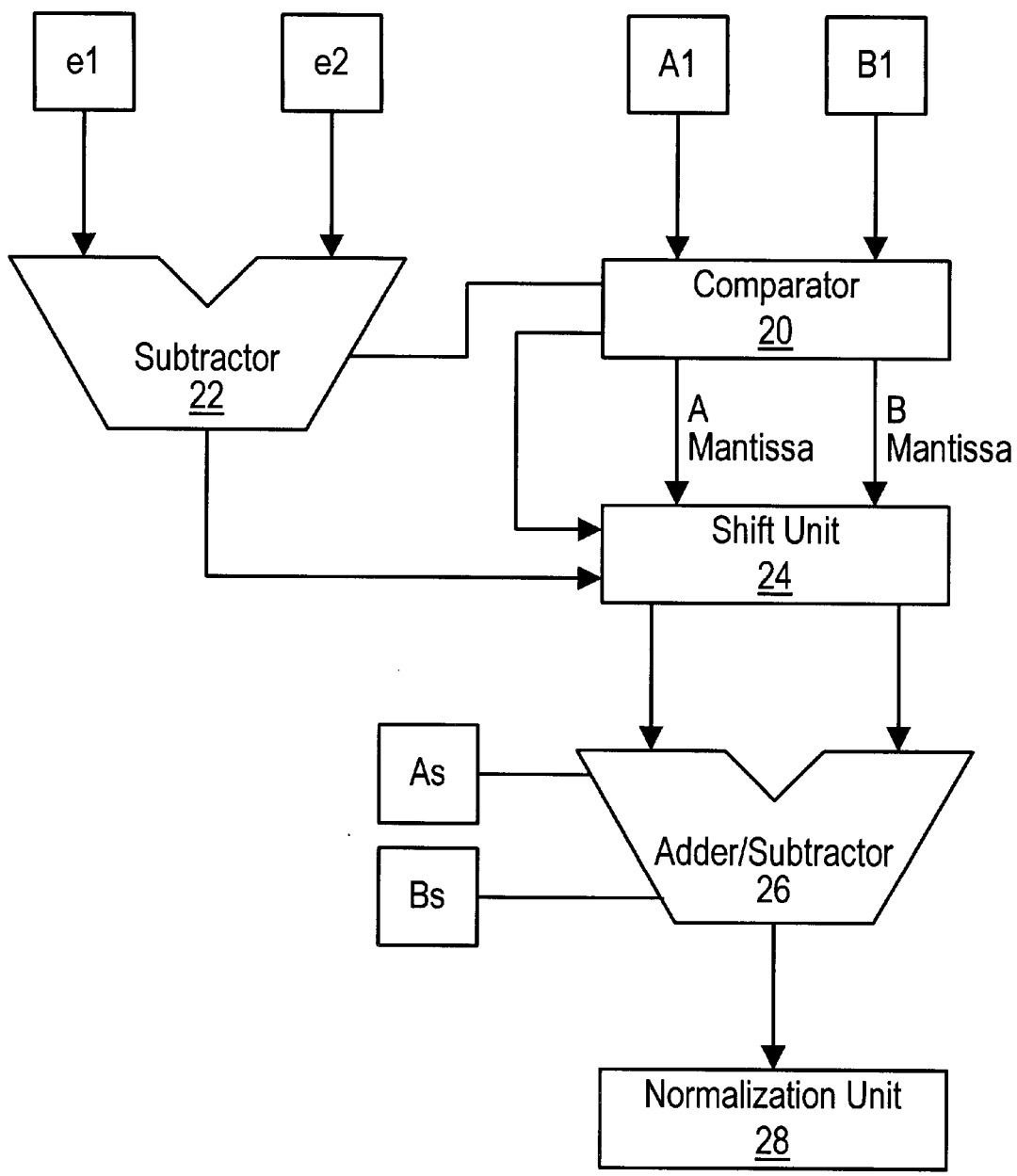
FIG. 2 is a block diagram illustrating functional aspects of a floating point arithmetic unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
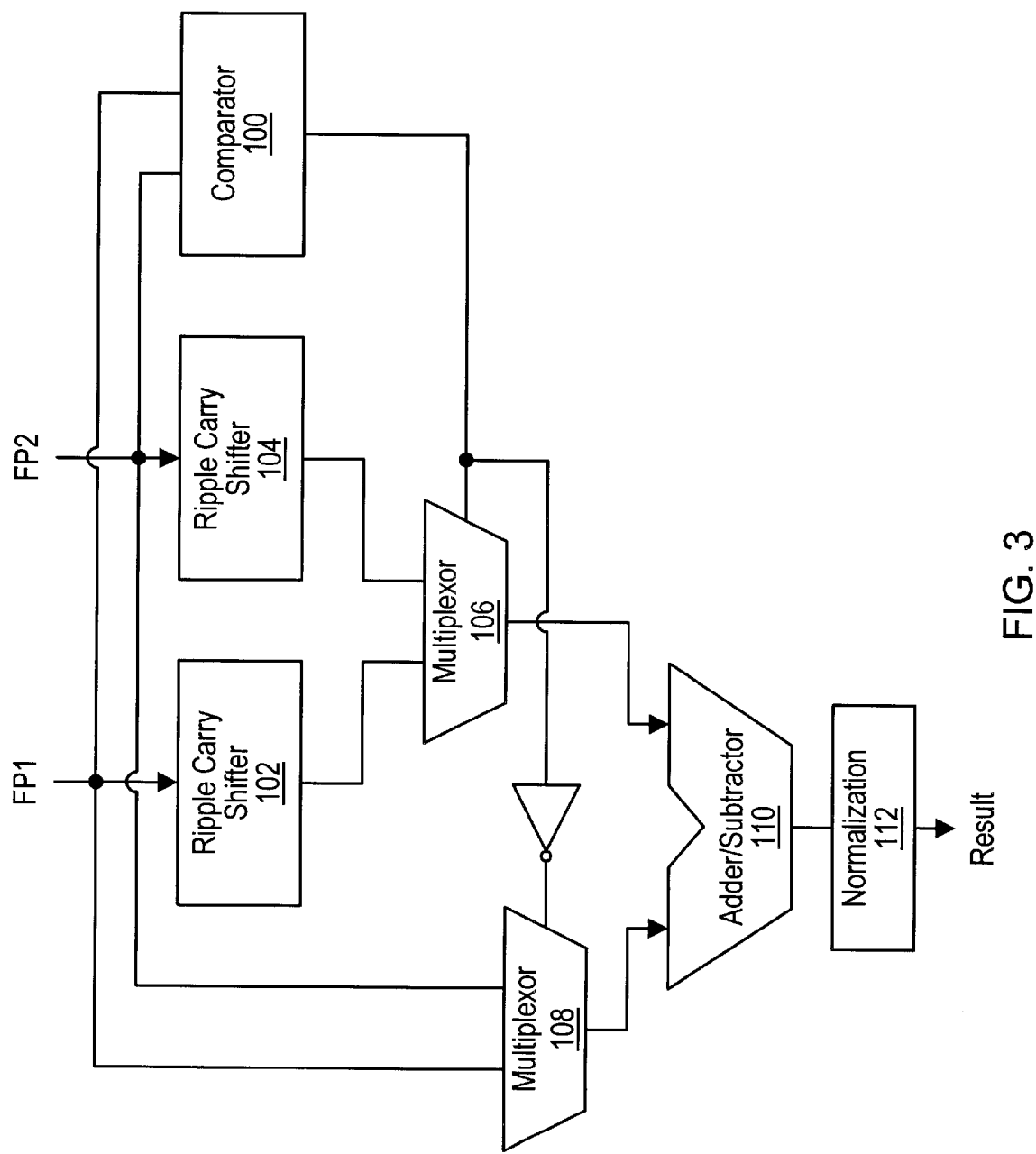
FIG. 3 is a block diagram illustrating aspects of a floating point arithmetic unit in accordance with one embodiment of the present invention.

Turning next to FIG. 3, a block diagram of portions of a floating point arithmetic unit in accordance with one embodiment of the present invention is shown. As illustrated, the floating point arithmetic unit includes a comparator 100 which is configured to compare the relative magnitudes of the exponents of two floating point numbers, FP1 and FP2, to be operated upon. The mantissa of the floating point number FP1 is further provided to a ripple carry shifter 102, while the mantissa of the floating point number FP2 is provided to a ripple carry shifter 104. As will be described in further detail below, the output of either ripple carry shifter 102 or ripple carry shifter 104 is selected by a multiplexer 106 in accordance with an output signal from comparator 100. Specifically, in this embodiment a shifted version of the mantissa of the floating point number FP1 or FP2 having the smaller exponent is selected by multiplexer 106. An unshifted version of the mantissa of the other floating point number (having the larger of the exponent values) is selected by a second multiplexer 108, in accordance with an inverted version of the output signal from comparator 100. Ripple carry shifters 102 and 104 shift the mantissa of the associated floating point number provided thereto to the right by a number of positions equal to the difference between the exponent values. That is, in this embodiment ripple carry shifter 102 is configured to subtract the exponent value of floating point number FP1 from the exponent value of the floating point number FP2, and to shift the mantissa of floating point number FP1 to the right by a number of positions equal to the calculated difference. Similarly, ripple carry shifter 104 is configured to subtract the exponent value of floating point number FP2 from the exponent value of the floating point number FP1, and to shift the mantissa of the floating point number FP2 by a number of positions to the right equal to the calculated difference. As stated previously, only one of the shifted mantissas is selected by multiplexor 106 for application to an input port of an adder/subtractor 110. The adder/subtractor unit 110 operates upon the unshifted mantissa of the floating point number having the larger exponent and upon the shifted mantissa of the floating point number having the smaller exponent in accordance with the desired operation (i.e., add or subtract), and depending upon the original signs of the numbers, if present. The result from adder/subtractor unit 110 may then be normalized by a normalization unit 112.

Figure 4:
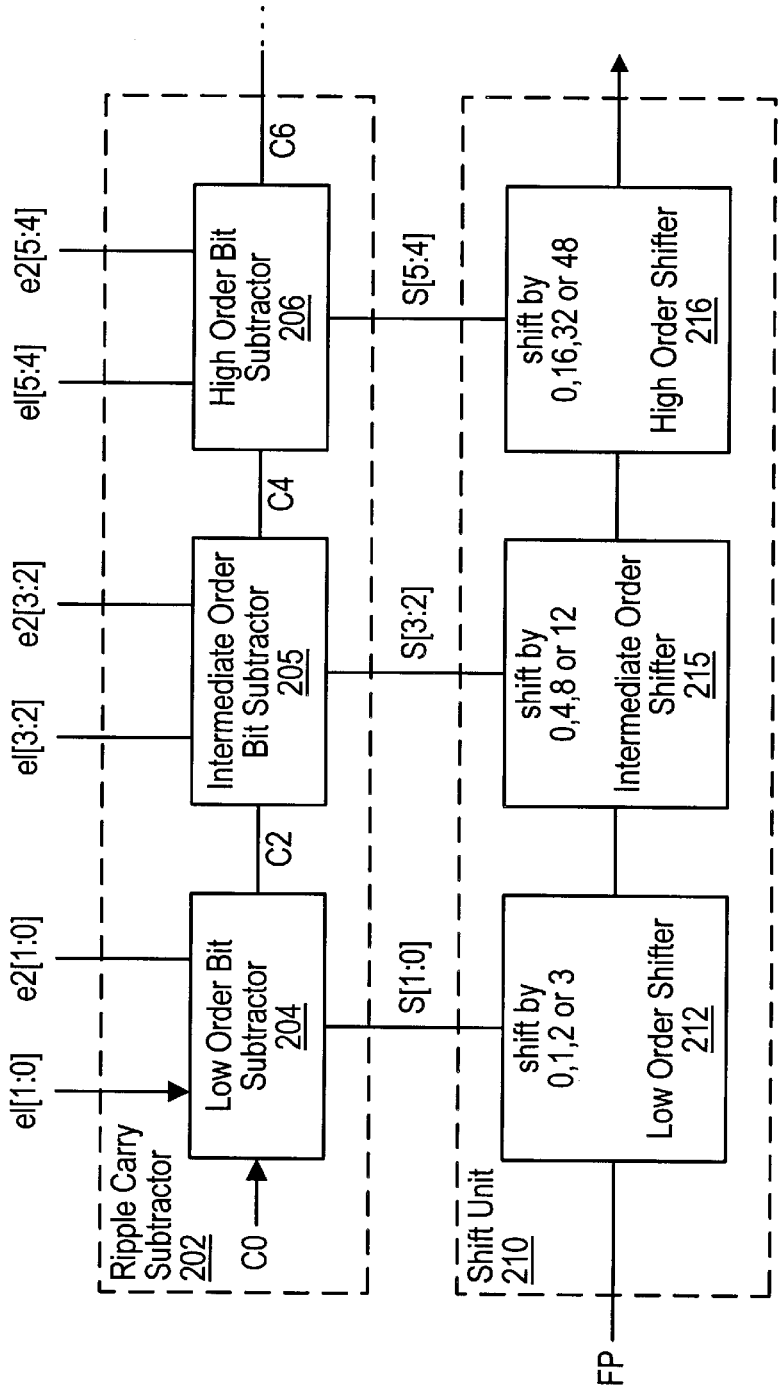
FIG. 4 is a block diagram illustrating an implementation of a carry ripple shifter in accordance with one embodiment of the present invention.

Turning next to FIG. 4, one implementation of a ripple carry shifter is shown. The carry ripple shifter of FIG. 4 includes a ripple carry subtractor 202 which subtracts the value of the exponent of one of the floating point numbers from the value of the exponent of the other floating point number. The ripple carry shifter is illustrative of each of the ripple carry shifters 102 and 104 of FIG. 3. As stated previously, it is noted that for the connection of the ripple carry shifter 102 of FIG. 3, the mantissa of floating point number FP1 is provided as input FP to the ripple carry shifter of FIG. 4, and the value of the exponent of floating point number FP1 is subtracted from the value of the exponent of floating point number FP2 by ripple carry subtractor 202. Likewise, for the connection of the ripple carry shifter 104 of FIG. 3, the mantissa of the floating point number FP2 is provided as input FP, and the value of the exponent of floating point number FP2 is subtracted from the value of the exponent of the floating point number FP1 by ripple carry subtractor 202.

As illustrated, ripple carry subtractor 202 includes a low order bit subtractor 204, an intermediate order bit subtractor 205, and a high order bit subtractor 206. In the illustrated implementation, the low order bit subtractor 204 subtracts the two lowest order bits of one of the exponents e1[1:0] from the two lowest order bits of the other exponent e2[1:0] to achieve a result S[1:0]. Similarly, intermediate order bit subtractor 205 is configured to subtract bits three and two of the exponent e1[3:2] from bits three and two of the exponent e2[3:2] to obtain a result S[3:2]. Finally, high order bit subtractor 206 is configured to subtract bits five and four of the exponent e1[5:4] from bits five and four of the exponent e2[5:4] to obtain a result S[5:4]. It is noted that a carry bit result c2 of the low order bit subtractor 204 is conveyed to the intermediate order bit subtractor 205 and is used to calculate the result S[3:2], and that a carry bit C4 from intermediate order bit subtractor 205 is conveyed to high order bit subtractor 206 and is used to calculate the result S[5:4]. Additional subtractors may be similarly coupled in a ripple carry subtractor configuration for additional bits of the exponent, as desired, depending upon the overall possible size of the exponents expressed in the system.

The mantissa of the floating point number having the exponent value being subtracted from the other is provided as an input to shift unit 210 which illustratively includes a low order shifter stage 212, an intermediate order shifter stage 215, and a high order shifter stage 216. As soon as the lower order result bits S[1:0] are generated by low order bit subtractor 204, low order shifter stage 212 shifts the input mantissa by 0, 1, 2 or 3 positions to the right depending upon the result S[1:0]. This shift operation begins before the results S[3:2] and/or S[5:4] are generated by intermediate order bit subtractor 205 and high order bit subtractor 206, respectively. Upon generation of the carry bit C2, the result S[3:2] is generated by intermediate order bit subtractor 205. The value of this intermediate result S[3:2] causes intermediate order shifter stage 215 to shift the mantissa (which may already have been shifted by low order shifter stage 212 in accordance with the value S[1:0]) by either 0, 4, 8 or 12 positions to the right. High order shifter stage 216 operates upon the output of intermediate order shifter stage 215 similarly by shifting the number either 0, 16, 32 or 48 positions to the right depending upon the value of S[5:4]. It is again noted that additional shifters and additional higher order bit subtractors may be provided for even higher order bits of the exponent, if present.

After the mantissa passes through each of the various shifter stages 212–216, the total amount of shift applied to the mantissa equals an amount corresponding to the overall result of the subtraction between the exponents, as implemented by the ripple carry subtractor 202. Since some of the shifts are effectuated prior to generation of the complete subtraction result, very little additional time is required to complete the overall shift once the high order results of the subtract operation are completed by high order bit subtractor 206. Accordingly, the shift result may be provided to the adder/subtractor circuit 110 more quickly.

Turning back to FIG. 3, at the same time each of the ripple carry shifter units 102 and 104 are performing the subtraction operations upon the exponents of the numbers and shifting the corresponding mantissas accordingly, comparator 100 generates an output signal which causes multiplexer 106 to select the result of the ripple carry shifter 102 or 104 which has shifted the mantissa of the floating point number having the smaller exponent value. This result is provided to adder/subtractor 110. The output signal from comparator 100 further causes multiplexer 108 to select the unshifted mantissa of the other floating point number for input to a second input port of adder/subtractor unit 110. Adder/subtractor unit 110 then performs either an addition or a subtraction operation upon the inputted mantissas depending upon the desired operation. The output of adder/subtractor unit 110 may then be normalized by normalization unit 112 to output a normalized result. In one embodiment, comparator unit 100 is implemented using a carry-skip chain configuration to thus generate an output signal which is dependent upon the relative magnitudes of the values of the floating point numbers FP1 and FP2. By using a carry-skip chain configuration, the desired result may be generated more quickly in comparison to an implementation of a comparator circuit which performs a full subtraction operation. Accordingly, comparator unit 100 preferably generates the appropriate output signal to control multiplexors 106 and 108 by the time the shift operations effectuated by ripple carry shifters 102 and 104 are completed.

Since the required shift operation performed by either ripple carry shifter 102 or ripple carry shifter 104 is performed more quickly, the overall result of the floating point arithmetic operation may also be obtained more expeditiously. Thus, when employed within a floating point unit of a microprocessor, the ripple carry shifter as described above may advantageously allow faster implementations to thereby support higher performance.

In another embodiment, rather than shifting the mantissa of the floating point number with the smaller exponent value to the right in accordance with a difference between the exponents of two floating point numbers being operated upon, the mantissa of the floating point number having the larger exponent is shifted to the left by a number of positions equal to the difference between the exponent values. Other aspects of the operation of this embodiment are similar to those described above.

It is further noted that while in the embodiment described above, pairs of bits corresponding to the result of the ripple carry subtraction operation are provided to control the shift associated with respective shift stages, other groupings of the bits of the result of the ripple carry subtraction operation may be provided to control the shift associated with successive shift stages. For example, in one embodiment individual bits corresponding to the results of the ripple carry subtraction operation are provided to control individual shift stages. The amount of shift provided by each shift stage in such an embodiment depends upon the order of the result bit associated with the shift stage. In any of these embodiments, lower order bit results of the ripple carry subtraction operation are used to begin the shifting of the mantissa of a floating point number prior to generating or determining the result of certain higher order in bits of the ripple carry subtraction operation.

Numerous variations and modifications will become apparent to those skilled in the art once the above disclosure is fully appreciated. It is intended that the following claims be interpreted to embrace all such variations and modifications.

What is claimed is:

1. A ripple carry shifter structure for a floating point arithmetic unit which performs arithmetic operations upon floating point numbers comprising:

a ripple carry subtractor unit configured to subtract an exponent of a first floating point number from an exponent of a second floating point number, wherein said exponent of each said first and second floating point numbers includes a set of low order bits, a set of intermediate order bits, and a set of high order bits, and wherein said ripple carry subtractor unit includes a low order bit subtractor stage for subtracting said set of low order bits of said exponent of said first floating point number from said set of low order bits of said exponent of said second floating point number, an intermediate order bit subtractor stage configured to subtract said set of intermediate order bits of said exponent of said first floating point number from said set of intermediate order bits of said exponent of said second floating point number, and a high order bit subtractor stage configured to subtract said set of high order bits of said exponent of said first floating point number from said set of high order bits of said exponent of said second floating point number, and wherein a carry result of said low order bit subtractor stage is provided as an input to said intermediate order bit subtractor, and wherein a carry result of said intermediate order bit subtractor stage is provided as an input to said high order bit subtractor; and a shift unit for shifting a mantissa of one of said first and second floating point numbers, wherein said shift unit includes a low order shifter stage coupled to receive a low order result from said low order bit subtractor stage and configured to begin a shift operation of said mantissa by a number of positions dependent upon said low order result before a result of said high order bit subtractor stage is determined, wherein said shift unit further includes an intermediate order shifter stage coupled to receive a result from said intermediate order bit subtractor, wherein said intermediate order shifter stage is configured to shift said mantissa by a number of positions controlled by said intermediate order result.

2. The ripple carry shifter structure as recited in claim 1 wherein an output of said low order shifter stage is provided to an input of said intermediate order shifter stage.

3. The ripple carry shifter structure as recited in claim 2 wherein said mantissa is shifted by said low order shifter stage prior to being shifted by said intermediate order shifter stage.

4. The ripple carry shifter structure as recited in claim 3 further comprising a high order shifter stage coupled to receive a high order result from said high order bit subtractor.

5. The ripple carry shifter structure as recited in claim 4 wherein said high order shifter stage is configured to shift said mantissa by a number of positions controlled by said high order result.

6. The ripple carry shifter structure as recited in claim 5 wherein an output of said intermediate order shifter stage is coupled to an input of said high order shifter stage.

7. The ripple carry shifter structure as recited in claim 6 wherein said mantissa is shifted by said intermediate order shifter stage before being shifted by said high order shifter stage.

8. A floating point arithmetic unit comprising:

an adder unit coupled to receive a shifted mantissa and an unshifted mantissa and configured to add said shifted mantissa to said unshifted mantissa; and a ripple carry shifter coupled to said adder unit including:

a ripple carry subtractor unit configured to subtract an exponent of a first floating point number from an exponent of a second floating point number, wherein said ripple carry subtractor unit is configured to generate low order bit subtraction results prior to generating higher order bit subtraction results, wherein said exponent of each said first and second floating point numbers includes a set of low order bits, a set of intermediate order bits, and a set of high order bits, and wherein said ripple carry subtractor unit includes a low order bit subtractor stage for subtracting said set of low order bits of said exponent of said first floating point number from said set of low order bits of said exponent of said second floating point number, an intermediate order bit subtractor stage configured to subtract said set of intermediate order bits of said exponent of said first floating point number from said set of intermediate order bits of said exponent of said second floating point number, and a high order bit subtractor stage configured to subtract said set of high order bits of said exponent of said first floating point number from said set of high order bits of said exponent of said second floating point number, and wherein a carry result of said low order bit subtractor stage is provided as an input to said intermediate order bit subtractor, and wherein a carry result of said intermediate order bit subtractor stage is provided as an input to said high order bit subtractor; and a shift unit coupled to said ripple carry subtractor unit and said adder unit for shifting a mantissa of one of said first and second floating point numbers to thereby generate said shifted mantissa, wherein said shift unit is configured to begin a shift operation of said mantissa in response to said low order bit subtraction results of said ripple carry subtractor unit before said higher order bit subtraction result is generated by said ripple carry subtractor unit, wherein said shift unit includes a low order shifter stage coupled to receive a low order result from said low order bit subtractor stage and configured to begin a shift operation of said mantissa by a number of positions dependent upon said low order result before a result of said high order bit subtractor stage is determined, wherein said shift unit further includes an intermediate order shifter stage coupled to receive a result from said intermediate order bit subtractor, wherein said intermediate order shifter stage is configured to shift said mantissa by a number of positions controlled by said intermediate order result.

9. The floating point arithmetic unit as recited in claim 8 wherein said shift unit is configured to shift said mantissa by a number of positions dependent upon said low order bit result before said high order bit result is generated.

10. The floating point arithmetic unit as recited in claim 9 wherein said shift unit is configured to shift said mantissa to the right by a number of positions dependent upon said low order bit result.

11. The floating point arithmetic unit as recited in claim 8 further comprising a comparator unit coupled to said ripple carry subtractor unit and configured to compare relative magnitudes of exponents of said first floating point number and said second floating point number.

12. The floating point arithmetic unit as recited in claim 11 wherein said comparator unit is configured to generate an output signal indicative of said relative magnitudes.

13. The floating point arithmetic unit as recited in claim 12 further comprising a selector circuit coupled to receive said output signal from said comparator unit and coupled to said shift unit, wherein said selector selects either a shifted version of said mantissa of said first floating point number or a shifted version of said mantissa of said second floating point number in accordance with said output signal for selection as said shifted mantissa provided to said adder unit.

* * * * *

UNITED STATES PATENT AND TRADEMARK OFFICE

CERTIFICATE OF CORRECTION

PATENT NO. : 5,901,076

DATED : May 4, 1999

INVENTOR(S): Thomas W. Lynch

It is certified that error appears in the above-identified patent and that said Letters Patent is hereby corrected as shown below:

On the title page: Item [73] Assignee:

<u>Assignee:</u>

Please change the assignee to read:

Advanced Micro Devices, Inc., Sunnyvale, CA.

Signed and Sealed this

Seventeenth Day of April, 2001

*Attest:*

NICHOLAS P. GODICI

*Attesting Officer*     *Acting Director of the United States Patent and Trademark Office*